(12) United States Patent
Sakai et al.

(10) Patent No.: US 11,223,734 B2
(45) Date of Patent: Jan. 11, 2022

(54) INFORMATION PROCESSING APPARATUS, METHOD OF CONTROLLING INFORMATION PROCESSING APPARATUS, AND NON-TRANSITORY COMPUTER-READABLE RECORDING MEDIUM

(71) Applicant: BROTHER KOGYO KABUSHIKI KAISHA, Nagoya (JP)

(72) Inventors: Katsunori Sakai, Toyokawa (JP); Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/261,664

(22) Filed: Jan. 30, 2019

(65) Prior Publication Data
US 2019/0238706 A1 Aug. 1, 2019

(30) Foreign Application Priority Data
Jan. 31, 2018 (JP) .............................. JP2018-014788

(51) Int. Cl.
*G06F 3/12* (2006.01)
*H04N 1/00* (2006.01)
*G06F 1/26* (2006.01)
*G06F 1/28* (2006.01)
*H02J 7/00* (2006.01)

(52) U.S. Cl.
CPC ......... *H04N 1/00888* (2013.01); *G06F 1/266* (2013.01); *G06F 1/28* (2013.01); *H04N 1/00907* (2013.01); *H02J 7/0068* (2013.01); *H04N 2201/0072* (2013.01)

(58) Field of Classification Search
CPC combination set(s) only.
See application file for complete search history.

(56) References Cited

U.S. PATENT DOCUMENTS

| | | | |
|---|---|---|---|
| 2012/0287467 A1* | 11/2012 | Yamano | G06F 3/1284 358/1.15 |
| 2015/0346794 A1* | 12/2015 | Sakashita | G06F 1/3287 713/310 |
| 2016/0257208 A1* | 9/2016 | Chong | H02J 1/10 |
| 2017/0142280 A1* | 5/2017 | Koiwai | H04N 1/00901 |
| 2017/0185126 A1* | 6/2017 | Trethewey | H02J 50/80 |
| 2017/0346962 A1* | 11/2017 | Yamada | H04N 1/32122 |
| 2019/0094937 A1* | 3/2019 | Sultenfuss | G06F 1/1635 |
| 2019/0207379 A1* | 7/2019 | Moritomo | H02H 1/0061 |
| 2019/0235593 A1* | 8/2019 | Wang | G06F 13/4282 |
| 2019/0238052 A1* | 8/2019 | Lorin | H02M 3/07 |

(Continued)

FOREIGN PATENT DOCUMENTS

| | | |
|---|---|---|
| JP | 2007-034614 A | 2/2007 |
| JP | 2015-174373 A | 10/2015 |
| JP | 2016-004515 A | 1/2016 |

*Primary Examiner* — Helen Zong
(74) *Attorney, Agent, or Firm* — Scully Scott Murphy and Presser

(57) ABSTRACT

A CPU of a printer requests a first external device to supply electric power via a first interface through communications according to the USB standard. When the CPU determines that the requested electric power is to be unsupplied from the first external device, the CPU requests a second external device to supply the electric power via a second interface.

12 Claims, 9 Drawing Sheets

(56) References Cited

U.S. PATENT DOCUMENTS

2019/0294228 A1* 9/2019 Tamura ................ G06F 1/3287
2020/0310512 A1* 10/2020 Mills .................... G06F 1/3287
2020/0358293 A1* 11/2020 Tsai ..................... H02J 7/0047
2020/0373843 A1* 11/2020 Camiolo ................ G06F 1/26

* cited by examiner

INFORMATION PROCESSING APPARATUS, METHOD OF CONTROLLING INFORMATION PROCESSING APPARATUS, AND NON-TRANSITORY COMPUTER-READABLE RECORDING MEDIUM

CROSS-REFERENCE TO RELATED APPLICATION

This application claims priority from Japanese Patent Application No. 2018-014788 filed on Jan. 31, 2018, the entire subject-matter of which is incorporated herein by reference.

TECHNICAL FIELD

The present disclosure relates to an information processing apparatus connected to a plurality of external devices via a plurality of USB connecting units, a method of controlling the information processing apparatus, and a non-transitory computer-readable recording medium.

BACKGROUND

There has been an information processing apparatus that supplies electric power to an external device by a method according to a USB Power Delivery (USB PD) standard (for example, JP-A-2015-174373). According to the USB PD standard, a large amount of power up to 1000 W can be supplied.

According to the USB PD standard described above, before supplying electric power, negotiation for power transmission is performed between a supply source device and a supply destination device, thereby setting the amount of electric power to be supplied, and the like. An information processing apparatus such as a printer may have a plurality of USB connecting units for performing communications according to the USB PD standard in order to connect to external devices, such as a personal computer and a USB memory. Accordingly, when electric power is needed, the information processing apparatus needs to negotiate with a plurality of external devices connected to the respective USB connecting units.

SUMMARY

An object of the present disclosure is to provide an information processing apparatus capable of receiving electric power from outside by performing negotiation for power transmission with a plurality of external devices, in a case where the plurality of external devices are connected thereto via a plurality of USB connecting units, a method of controlling the information processing apparatus: and a non-transitory computer-readable recording medium therefor.

An information processing apparatus according to the present disclosure includes a first interface, a second interface, and a controller. The controller requests a first external device to supply electric power via the first interface, determines whether the first external device accepts the request to supply electric power, and requests a second external device to supply electric power via the second interface when the controller determines that the first external device does not accept the request to supply the electric power.

The disclosure of the present application can be implemented not only as an information processing apparatus but also as a method of controlling the information processing apparatus, and a non-transitory computer-readable recording medium storing computer-readable instructions for the information processing apparatus.

According to the present disclosure, in the case where electric power is not supplied even if the first external device is requested to supply the electric power via the first interface, the controller requests the second external device to supply the electric power via the second interface. Thus, even when the electric power is not supplied by requesting the first external device to supply electric power via the first interface, the second external device is requested to supply electric power via the second interface, thereby increasing the possibility for the information processing apparatus to receive electric power from the outside.

According to the information processing apparatus and the like according to the present disclosure, when a plurality of external devices are connected via a plurality of interfaces, the information processing apparatus can receive electric power supplied from outside by performing negotiation for power transmission with the plurality of external devices.

DETAILED DESCRIPTION

First Embodiment

A portable printer 1 which is a first embodiment embodying an information processing apparatus of the present disclosure will be described with reference to FIG. 1.

1. Configuration of Portable Printer

Figure 1:
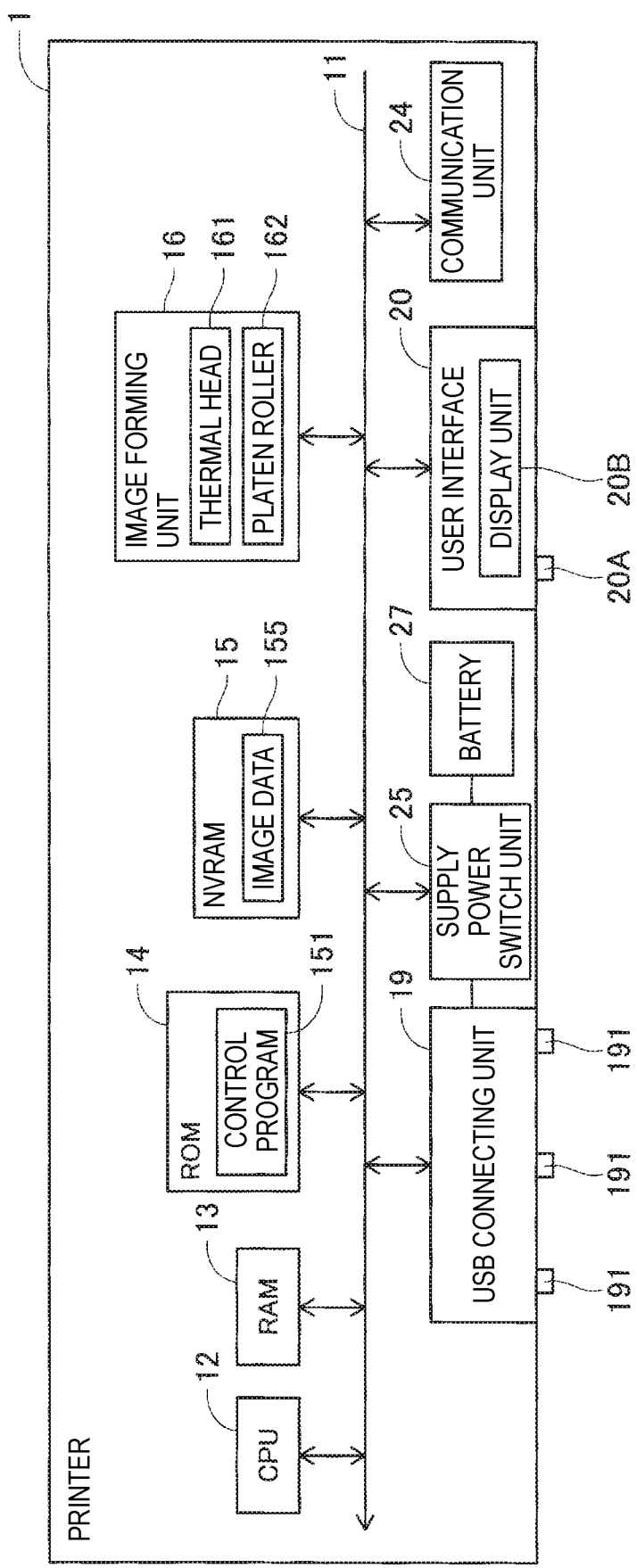
FIG. 1 is a block diagram illustrating an electrical configuration of a printer according to a first embodiment.

FIG. 1 illustrates an electrical configuration of the portable printer 1 according to the first embodiment. The printer 1 is a portable printing apparatus capable of being carried, and prints print data received through wired communications or wireless communications with, for example, a PC, a smartphone, or the like onto a predetermined sheet (thermal paper or the like). The printer 1 includes a CPU 12, a RAM 13, a ROM 14, a NVRAM 15, an image forming unit 16, a USB connecting unit 19, a user interface 20, a communication unit 24, a supply power switch unit 25, and the like. The CPU 12 and the other components are connected to one another via a bus 11.

The printer 1 of the present embodiment further includes a battery 27. The supply power switch unit 25 is connected to each of the components of the printer 1 and can supply electric power from the battery 27 to each of the components of the printer 1. Thus, the printer 1 can be driven by using the battery 27 as a power source, and can be used by being carried to various places. The printer 1 may be provided with a connector (a DC jack or the like) for connection to an AC adapter. In this case, the supply power switch unit 25 may drive the printer 1 and charge the battery 27 based on the electric power supplied via the connector. In addition, the printer 1 may be configured not to include the battery 27. In this case, the printer 1 may be configured to be driven by the electric power supplied from the outside via the USB connecting unit 19.

The ROM 14 is, for example, a nonvolatile memory such as a flash memory, and stores various programs such as a control program 151. For example, the CPU 12 executes the control program 151 read from the ROM 14, and starts a system of the printer 1. Image data 155 is stored in the NVRAM 15. Destinations in which the above data is stored are merely examples. For example, the control program 151 may be stored in the NVRAM 15.

The control program 151 is, for example, firmware for overall control of each of the components of the printer 1. The CPU 12 executes the control program 151, temporarily stores a result of performing the execution in the RAM 13, and controls the components connected via the bus 11. The image data 155 is, for example, image data of a print job received through wired communications or wireless communications with a PC, a smartphone or the like.

The image forming unit 16 includes, for example, a line type thermal head 161, and prints an image onto a sheet by a direct thermal method based on the control of the CPU 12. The image forming unit 16 conveys the sheet by rotating a platen roller 162 provided opposite the thermal head 161. For example, if a sheet is inserted into an insertion slot of the printer 1 when printing is started, the inserted sheet is guided to a location opposite to the platen roller 162 and the thermal head 161, and is discharged via a discharge port after printing is completed.

The USB connecting unit 19 is, for example, an interface performing communications according to the USB power delivery (USB PD) standard and the supply of electric power. The USB connecting unit 19 includes, for example, three receptacles 191 as connectors. The USB connecting unit 19 performs data communications and the supply of electric power between various external devices connected to the receptacles 191. As the external devices connected thereto, for example, various devices, which can be connected according to the USB standard, such as a USB memory, a personal computer, an external hard disk, a smartphone and a card reader can be adopted.

The receptacles 191 are, for example, connectors according to the USB Type-C standard. Each of the receptacles 191 includes, for example, a plurality of pins for data communications and the supply of electric power. For example, the receptacle 191 includes a D+ pin, a D- pin, a Vbus pin, and the like as a plurality of pins in a connector of the USB Type-C standard. The receptacle 191 performs data communications using the D+ pin and the D- pin. In addition, the receptacle 191 uses the Vbus pin to supply and receive electric power. A CC pin is used for negotiation for the supply of electric power. Here, the negotiation for the supply of electric power is, for example, processes of setting whether to be a power source which is a power supply source and a power sink which is a supply destination, setting an amount of electric power to be supplied, and the like.

The USB connecting unit 19 is connected to the battery 27 via the supply power switch unit 25. The supply power switch unit 25 includes a so-called PD controller, and changes electric power to be supplied, for example, to an external device from the USB connecting unit 19 via the Vbus pin. Electric power is supplied to the supply power switch unit 25 from an external device connected to the USB connecting unit 19, or the battery 27. The supply power switch unit 25 supplies electric power, for example, from a certain external device to another external device. Further, the supply power switch unit 25 generates three types of voltages, for example, 20 V, 12 V, and 5 V, from the electric power supplied from the external device or the battery 27. The supply power switch unit 25 can supply the electric power obtained from a combination of a plurality of types of voltage values and a plurality of current values to the USB connecting unit 19. The CPU 12 controls the supply power switch unit 25 by executing the control program 151. Under the control of the CPU 12, the supply power switch unit 25 changes the combination of the voltage values and the current values of the electric power to be supplied to the USB connecting unit 19. As a result, a voltage value and a current value of the electric power supplied from the USB connecting unit 19 to an external device are changed.

The CPU 12 and the supply power switch unit 25 may not be configured with separate processing circuits but may be configured with one processing circuit. The control of the supply of electric power from the USB connecting unit 19 may be performed by controlling the supply power switch unit 25 with the CPU 12 or may be performed directly by the supply power switch unit 25. For example, the negotiation for the supply of electric power described above may be performed by either the CPU 12 or the supply power switch unit 25. In addition, the supply power switch unit 25 is not limited to a configuration that supplies electric power by combining specific voltage values and current values, and may be configured to generate electric power of a desired voltage value or current value.

The user interface 20 includes a power key 20A to turn on or off a power supply. For example, when the power key 20A is pressed in a power-off state of the printer 1, the CPU 12 turns on the printer 1 by causing the power supply switch unit 25 to supply electric power to each of the components of the printer 1. When the power key 20A is pressed in a power-on state of the printer 1, the CPU 12 turns off the printer 1 by causing the supply power switch unit 25 to stop the supply of electric power to each of the components of the printer 1. The user interface 20 includes a display unit 20B that displays various information regarding the printer 1. The display unit 20B is, for example, a touch panel, and includes a liquid crystal panel, a light source such as an LED that emits light from a back side of the liquid crystal panel, a touch sensing film adhered to a surface of the liquid crystal panel, and the like. The display unit 20B changes information displayed on the liquid crystal panel based on the control of the CPU 12. Furthermore, the display unit 20B outputs a signal corresponding to an input which is input by manipulating the touch panel to the CPU 12.

The communication unit 24 is capable of wireless communications or infrared communications. When printing is performed by the printer 1, for example, a user may transmit a print job for executing printing to the printer from a smartphone through wireless communications. The CPU 12 controls the communication unit 24 to accept the print job (the image data 155 or the like) through wireless communications. The CPU 12 executes printing by the image forming unit 16 based on the received print job.

2. Power Supply Control

Figure 2:
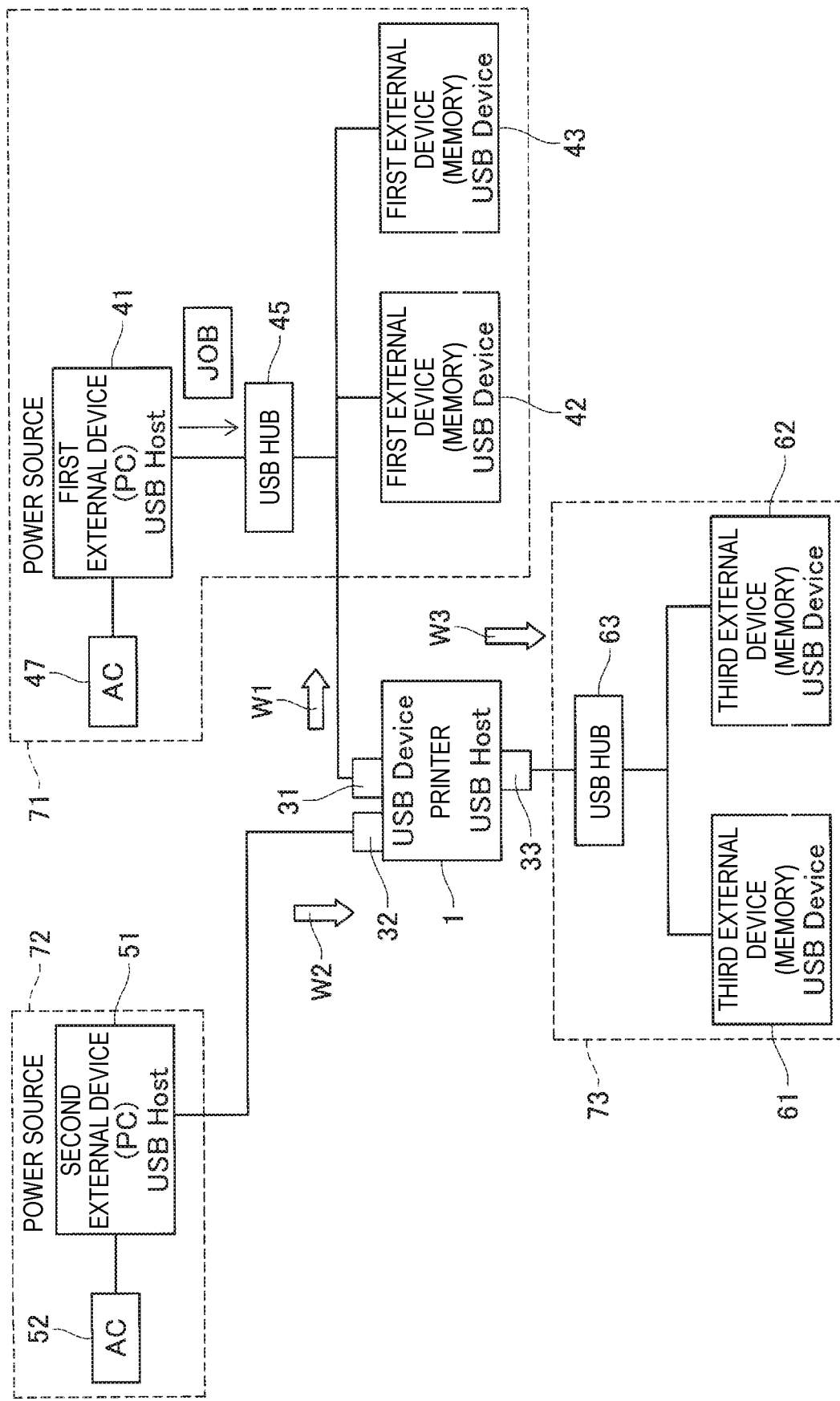
FIG. 2 is a diagram illustrating a connection configuration for supplying power.

Next, in the printer 1 of the present embodiment, power supply control performed by the USB connecting unit 19 will be described. First, an example of a connection configuration for supplying electric power will be described. FIG. 2 illustrates an example of a connection configuration for supplying electric power, in which a plurality of external devices are connected to the USB connecting unit 19 of the printer 1. In the following description, in order to distinguish the three receptacles 191 (see FIG. 1) of the USB connecting unit 19 from each other, the three receptacles 191 will be referred to as a first USB connecting unit 31, a second USB connecting unit 32, and a third USB connecting unit 33, respectively. First external devices 41 to 43, a second external device 51, and third external devices 61 and 62, which are illustrated in FIG. 2, each includes a USB connecting unit to perform communications based on the USB PD standard and thus performs power transmission between different devices including the printer 1. In the following description, a power system connected to the first USB connecting unit 31 will be referred to as a first power system 71, a power system connected to the second USB connecting unit 32 will be referred to as a second power system 72, and a power system connected to the third USB connecting unit 33 will be referred to as a third power system 73. Furthermore, in the following description, the CPU 12 that executes the control program 151 may be described simply as the CPU 12. For example, the description "CPU 12" may mean "the CPU 12 executing the control program 151".

As illustrated in FIG. 2, the three first external devices 41 to 43 are connected to the first USB connecting unit 31. The first external devices 41 to 43 are connected to the first USB connecting unit 31 via a USB hub 45. The first external device 41 is, for example, a personal computer. The first external device 41 is connected to a commercial power supply 47 and thus electric power is supplied from the commercial power supply 47. The first external devices 42 and 43 are, for example, USB memories, external hard disks, smartphones, and the like. The first external devices 42 and 43 are not connected to the commercial power supply 47 and receive electric power through a connection according to the USB PD standard. In the first power system 71 of the first USB connecting unit 31, the first external device 41 functions, for example, as a host in data communications through USB connection and thus performs polling with respect to the printer 1, and the first external devices 42 and 43, which are set as devices. In the following description, a host in data communications through USB connection will be referred to as a USB host, and a device in the USB connection will be referred to as a USB device. In this case, the first external device 41 is a USB host, and the printer 1 and the first external devices 42 and 43 are USB devices. FIG. 2 illustrates the relationship between a USB host and USB devices in the first to third power systems 71 to 73. The relationship between the USB host and the USB devices is merely an example.

The second external device 51 is connected to the second USB 32. The second external device 51 is, for example, a personal computer. The second external device 51 is connected to a commercial power supply 52, and electric power is supplied from the commercial power supply 52. In the second power system 72 of the second USB connecting unit 32, the second external device 51 functions as a USB host, and the printer 1 functions as a USB device.

The two third external devices 61 and 62 are connected to the third USB connecting unit 33. The third external devices 61 and 62 are connected to the third USB connecting unit 33 via a USB hub 63. The third external devices 61 and 62 are, for example, USB memories, external hard disks, smartphones, and the like. The third external devices 61 and 62 are not connected to a commercial power supply, and receive electric power through a connection according to the USB PD standard. In the third power system 73 of the third USB connecting unit 33, the printer 1 functions as a USB host, and the third external devices 61 and 62 function as USB devices.

Figure 3:
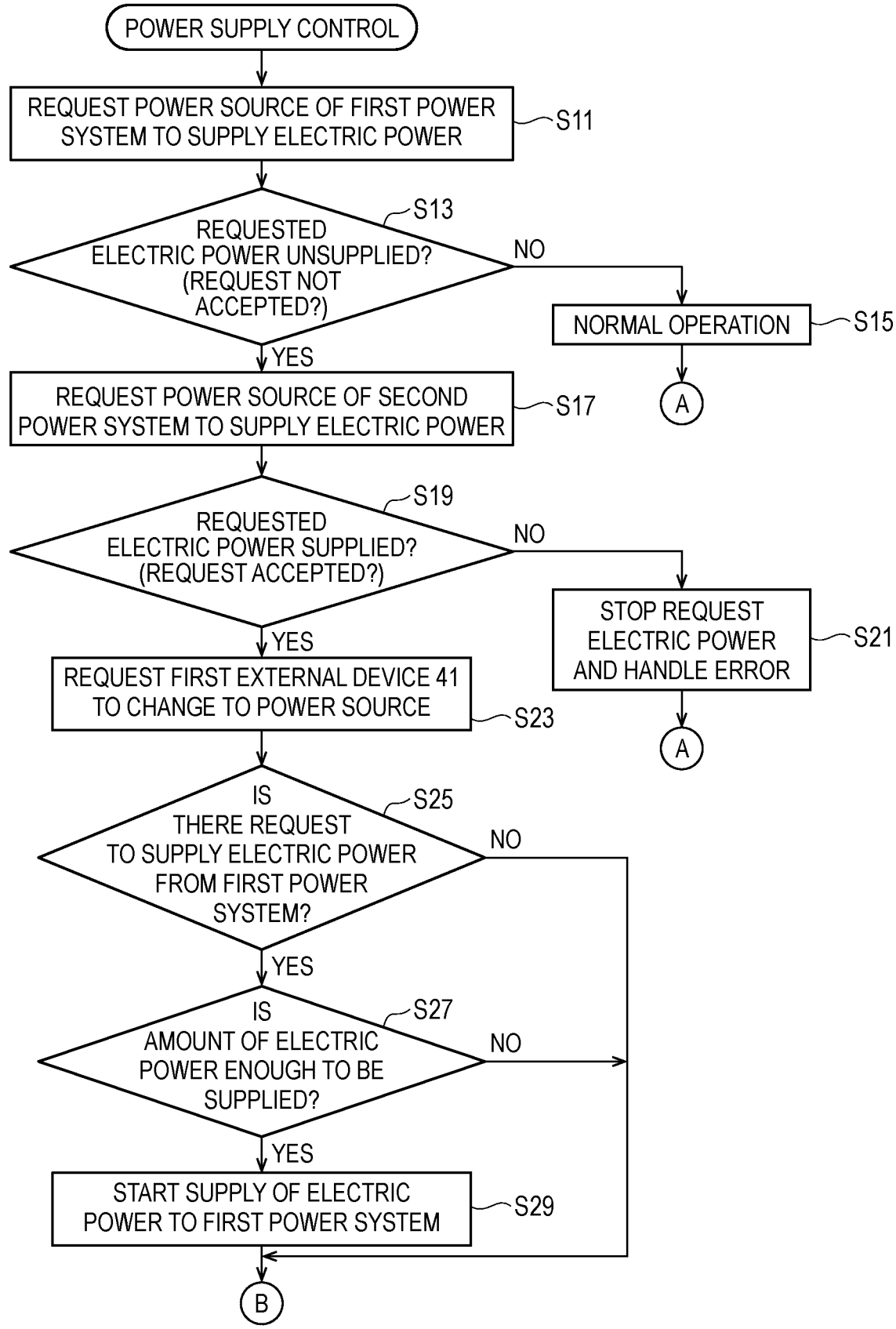
FIG. 3 illustrates a flowchart illustrating the content of power supply control.
Figure 4:
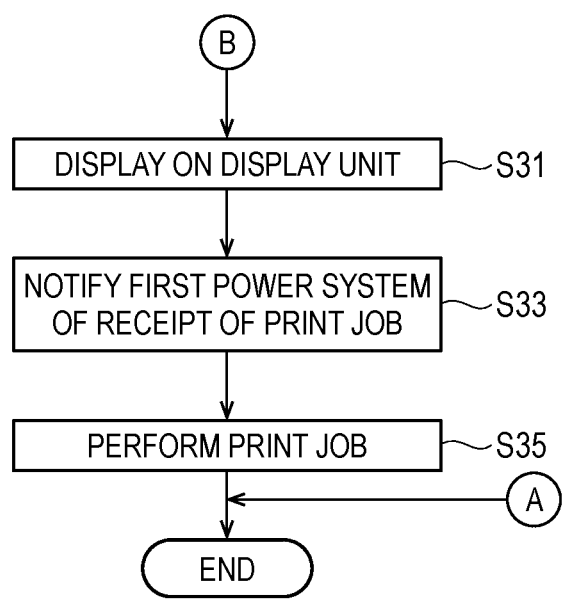
FIG. 4 illustrates a flowchart illustrating the content of the power supply control.

Next, in the printer 1, power supply control performed via the USB connecting unit 19 will be described with reference to FIGS. 3 and 4. The CPU 12 executes, for example, the control program 151 stored in the ROM 14 to start the system of the printer 1. When the CPU 12 detects a new connection to the USB connecting unit 19 after the start of the system of the printer 1, the CPU 12 starts power supply control as illustrated in FIGS. 3 and 4. FIGS. 3 and 4 illustrate an example case in which a connection of the USB hub 45 to the first USB connecting unit 31 is detected. In the following description, power supply control performed when the first external devices 41 to 43 are connected after connecting the second external device 51 and the third external devices 61 and 62 will be described. An order and details of the control to be described below are merely examples and thus may be appropriately changed according to a connection order and the like. A timing to start the power supply control illustrated in FIGS. 3 and 4 is not limited to a timing when a new connection is detected as described above. For example, the CPU 12 may start the power supply control illustrated in FIGS. 3 and 4 when the system of the printer 1 is started.

First, before connecting the USB hub 45, the printer 1 is connected to the second external device 51 and the third external devices 61 and 62. For example, the printer 1 is started by pressing the power key 20A (see FIG. 1) in a state in which the second external device 51 and the third external devices 61 and 62 are connected thereto. The CPU 12 performs negotiation for the supply of electric power with the second external device 51 via the second USB connecting unit 32. The second external device 51 is set as a power source for the printer 1. The printer 1 is set as a power sink for the second external device 51. The second external device 51 supplies supply power W2 (see FIG. 2) to the printer 1 via the second USB connecting unit 32. In this case, the second external device 51 functions as a power supply source for the printer 1. Furthermore, the CPU 12 performs negotiation for the supply of electric power with the third external devices 61 and 62, and is set as a power source for the third external devices 61 and 62. The CPU 12 supplies supply power W3 (see FIG. 2) to the third external devices 61 and 62 via the third USB connecting unit 33.

Next, the first external devices 41 to 43 are connected to the first USB connecting unit 31 of the printer 1 via the USB hub 45. The CPU 12 performs negotiation for the supply of electric power with the first external device 41 via the first USB connecting unit 31. The first external device 41 is set as a power source for the printer 1. The printer 1 is set as a power sink for the first external device 41.

Here, the printer 1 of the present embodiment is not connected to a commercial power supply, and is thus driven by electric power supplied from the battery 27 and the second external device 51. Thus, when a new connection is detected, the CPU 12 requests a power source of the newly connected first power system 71 to supply necessary electric power. Here, the necessary electric power refers to, for example, electric power necessary for driving the printer 1 and electric power to be supplied from the printer 1 to another external device.

In FIG. 3, in step (hereinafter simply referred to as "S") 11, the CPU 12 requests the first external device 41, which is a power source of the first power system 71, to supply necessary electric power. The CPU 12 performs communications according to the USB PD standard with the first external device 41 via the first USB connecting unit 31, and requests the first external device 41 to supply electric power.

Next, in S13, the CPU 12 determines whether the requested electric power is to be supplied from the first external device 41. The CPU 12 determines whether the requested electric power is to be supplied, for example, based on a response of the first external device 41 to the request in S11. When it is determined that the requested electric power is to be supplied from the first external device 41 (S13: NO), the CPU 12 starts a normal operation (S15). For example, in S15, the CPU 12 is driven by the electric power of which an insufficient amount is supplied from the first external device 41. Upon receiving a print job JOB (see FIG. 2) instructing to perform printing from the first external device 41 via the first USB connecting unit 31, the CPU 12 executes the received print job JOB. In this way, the printer 1 receives electric power from the second external device 51 and the first external device 41, and performs printing. The CPU 12 ends the power supply control as illustrated in FIG. 3. In the present embodiment, "it is determined that the requested electric power is to be supplied" means for example "it is determined that a response indicating acceptance of supplying electric power is received from a device to which the electric power is requested in response to the request to supply the electric power." The device to which the electric power is requested is the first external device 41 or the second external device 51. For example, in S13, when it is determined that a response indicating the acceptance is received from the first external device 41 in response to the request to supply the electric power (S13: NO), the CPU 12 executes S15.

On the other hand, when it is determined that the requested electric power is to be unsupplied from the first external device 41 (S13: YES), the CPU 12 requests the second external device 51 which is another power source to supply the electric power (S17). Here, the first external device 41 may have power shortage due to various causes such as an increase in load to be processed, disconnection of the commercial power supply 47, or the like, and thus may not be capable of supplying the electric power in response to the request from the printer 1. In this case, the CPU 12 requests the second external device 51 which is another power source to supply electric power, instead of the first external device 41. For example, in S17, the CPU 12 requests the second external device 51 to supply the amount of electric power that has been requested to the first external device 41 in S11. In the present embodiment, "it is determined that the requested electric power is to be unsupplied" means for example any one of the following (1) to (3). A device to which the electric power is requested is the first external device 41 or the second external device 51. The CPU 12 receives each response from the device to which the electric power is requested through a USB connecting unit.
(1) It is determined that a response indicating rejection of supplying electric power is received from the device to which the electric power is requested in response to the request to supply the electric power.
(2) It is determined that a response indicating acceptance of supplying electric power is not received from the device to which the electric power is requested in response to the request to supply the electric power.
(3) The electric power supplied from the device to which the electric power is requested is lower than the requested electric power.

Next, in S19, the CPU 12 determines whether the requested electric power is to be supplied from the second external device 51. When it is determined that the electric power requested to the second external device 51 is to be unsupplied (S19: NO), the CPU 12 ends the process of requesting an external device to supply the electric power (S21). In this case, there is a possibility that the printer 1 becomes in power shortage and thus cannot be operated normally. Thus, in S21, the CPU 12 performs a process of stopping the operation, a process of notifying an alarm, a process of displaying an error on the display unit 20B, or the like. When there is a power source, for example, in the third power system 73, in addition to the first external device 41 and the second external device 51, the CPU 12 may request the power source of the third power system 73 to supply the necessary electric power. By performing S21, the CPU 12 ends the power supply control illustrated in FIG. 3.

On the other hand, when it is determined in S19 that the electric power requested to the second external device 51 is to be supplied (S19: YES), the CPU 12 notifies a request to set the own device (the printer 1) as a power source of the first power system 71 (S23). The CPU 12 notifies the request to set the printer 1 as a power source to the first external device 41, which is the power source of the first power system 71, via the first USB connecting unit 31. The CPU 12 notifies the request to the first external device 41 through communications according to the USB PD standard. The printer 1 is changed to the power source from the power sink in the first power system 71. As a result, the printer 1 is changed from a state in which the printer 1 is supplied with electric power from the first power system 71 to a state in which the printer 1 supplies electric power to the first power system 71. That is, the printer 1 requests the first power system 71 to change a power supply direction, and changes the power supply direction. The CPU 12 may change the power supply direction with respect to the first power system 71 by a method other than the method of requesting to set the printer 1 as a power source. "changing the power supply direction" means for example "changing a power role" or "swapping a power role." In the USB PD standard, "changing the power supply direction" indicates "swapping a power role," and "request for changing the power supply direction" means "request for swapping a power role."

As described above, even when the electric power is to be unsupplied from the first external device 41, the printer 1 can be supplied with the electric power from the second external device 51, thereby continuously supplementing insufficient electric power. Furthermore, the printer 1 is set as a power source of the first power system 71, which is a new power system, and thus the electric power supplied from the second power system 72, which is another power system, can be supplied to the first power system 71, which is the new power system. For example, when electric power is to be unsupplied from the first external device 41 in S13, there is a high possibility that the first external devices 42 and 43 connected to the first power system 71 which is the same as the power system of the first external device 41 are not supplied with electric power from the first external device 41, and thus have power shortage. In contrast, the CPU 12 can supply electric power supplied from the second external device 51 to the first external devices 42 and 43, thereby supplementing the insufficient electric power.

After S23 is performed, the CPU 12 determines whether there is a request to supply electric power from the first external devices 41 to 43 of the first power system 71 (S25). The CPU 12 checks whether there is a request to supply electric power from each of the first external devices 41 to 43 through communications according to the USB PD standard. When it is determined in S25 that there is no request to supply electric power from the first external devices 41 to 43 (S25: NO), the CPU 12 performs S31 of FIG. 4.

On the other hand, when it is determined that there is a request to supply electric power from at least one of the first external devices 41 to 43 (S25: YES), the CPU 12 determines whether the amount of the requested electric power can be supplied (S27). The CPU 12 compares the supply power W2 supplied from the second external device 51 with the amount of the electric power requested from the first external devices 41 to 43, and determines whether the amount of the requested electric power can be supplied. When there are requests to supply electric power, for example, from a plurality of the first external devices 41 to 43, the CPU 12 determines whether the requested electric power can be supplied based on a total of the amounts of electric power requested from the plurality of the first external devices 41 to 43. When there are requests from the plurality of the first external devices 41 to 43, the CPU 12 may sequentially determine whether each of the amounts of electric power requested from the respective first external devices 41 to 43 can be supplied.

When it is determined in S27 that the requested electric power cannot be supplied (S27: NO), the CPU 12 performs S31 of FIG. 4. When it is determined in S27 that the requested electric power can be supplied (S27: YES), the CPU 12 supplies the requested electric power to each of the first external devices 41 to 43 (S29).

After S29 is performed, the CPU 12 performs S31 of FIG. 4. In S31, the CPU 12 performs a display process on the display unit 20B of the user interface 20. The printer 1 is in a state in which electric power is supplied from the second external device 51 as described above. In addition, when S29 described above is performed, an external device to which electric power is supplied from the second external device 51 is generated among the first external devices 41 to 43 of the first power system 71 via the printer 1. Thus, in S31, the CPU 12 displays on the display unit 20B a warning not to disconnect from the second external device 51 which is a power source. For example, the CPU 12 displays on the display unit 20B, a warning not to separate other external devices connected to the second USB connecting unit 32. Alternatively, the CPU 12 may cause the display unit 20B to display the vendor ID and the product ID of the second external device 51 and to display a warning not to disconnect from the specific power source. Accordingly, it is possible to prevent disconnection from the power source which supplies electric power.

After S31 is performed, the CPU 12 notifies the first external devices 41 to 43 of the newly connected first power system 71 that the printer 1 is in a state capable of receiving a print job JOB (S33). After the first power system 71 is newly connected, the CPU 12 can be supplied with electric power from the second external device 51, thereby continuously supplementing the insufficient electric power. Therefore, the CPU 12 notifies the newly connected first external devices 41 to 43 that the printer 1 is in a state capable of receiving the print job JOB to perform printing. When the print job JOB is received, for example, from the first external device 41 after notifying that the print job JOB is receivable, the CPU 12 performs printing based on the received print job JOB (S35). The CPU 12 continues the supply of electric power and data communications with the first external devices 41 to 43, the second external device 51, and the third external devices 61 and 62. Accordingly, the CPU 12 controls the supply of electric power to an external device connected to the USB connecting unit 19.

3. First Power Amount Change Control

Next, first power amount change control which is a control when a request to change the amount of supplied electric power is received from an external device of a power sink which is a supply destination of electric power will be described with reference to FIGS. 5 and 6. As an example, when electric power is supplied to the first power system 71, a case in which a request to change the amount of supplied electric power is received from one of the first external devices 41 to 43 of the first power system 71 will be described below.

Figure 5:
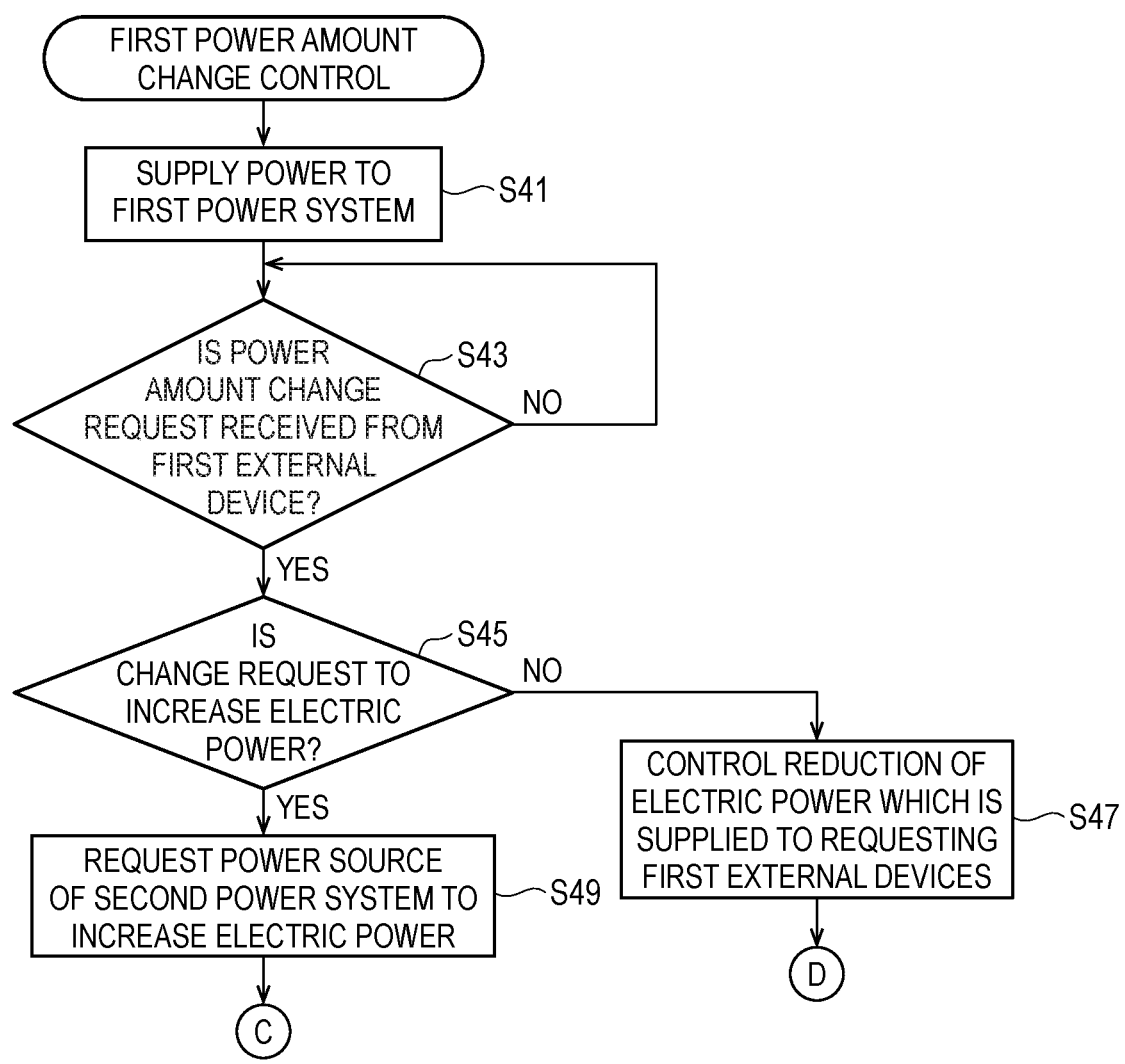
FIG. 5 illustrates a flowchart illustrating the content of first power amount change control.

First, in S41 of FIG. 5, the CPU 12 supplies electric power to the first external devices 41 to 43 of the first power system 71. For example, when S29 of FIG. 3 described above is performed, the CPU 12 can supply the supply power W1 (see FIG. 2) to the first external devices 41 to 43. Next, while the supply power W1 is supplied to the first power system 71, the CPU 12 determines whether a power amount change request is received from the first external devices 41 to 43 of the first power system 71 (S43). When the power amount change request is not received from any one of the first external devices 41 to 43 (S43: NO), the CPU 12 repeatedly performs the determination of S43.

When the power amount change request is received from one of the first external devices 41 to 43 (S43: YES), the CPU 12 determines whether the received change request is a request to increase the electric power (S45). When it is determined that the power amount change request received in S43 is not the request to increase the electric power, that is, the request is a request to reduce the power (S45: NO), the CPU 12 performs S47. In this case, since it is unnecessary to newly secure electric power, the CPU 12 performs control to reduce electric power to be supplied to the first external devices 41 to 43 (S47). The CPU 12 ends the first power amount change control illustrated in FIGS. 5 and 6.

In the present embodiment, the change request from an external device as a power sink includes "the request to increase the electric power" and "the request to reduce the electric power." The external device as a power sink indicates for example the first external devices 41 to 43.

"the request to reduce the electric power from an external device as a power sink" means for example "a request for electric power supplied from the external device as a power sink, the request for electric power of a power amount (including 0 W, default power) smaller than a power amount supplied from the own device to the external device as a power sink." The default power indicates default power defined in the USB standard.

"the request to increase the electric power from an external device as a power sink" means for example "a request for electric power supplied from the external device as a power sink, the request for electric power of a power amount larger than a power amount supplied from the own device to the external device as a power sink."

In a case where the own device is a power sink, as is the above case, the CPU 12 sends the change request to an external device through each USB connecting unit.

Meanwhile, when it is determined in S45 that the change request is a request to increase the electric power (S45: YES), the CPU 12 requests the second external device 51 of the second power system 72 to increase electric power (S49). Thus, when an increase of electric power is requested from a certain external device connected to the USB connecting unit 19, the CPU 12 of the present embodiment secures the insufficient electric power by requesting the power source of the own device (the printer 1) to increase electric power. Accordingly, when there is a power source other than the second external device 51, the CPU 12 may request the power source to increase electric power.

Figure 6:
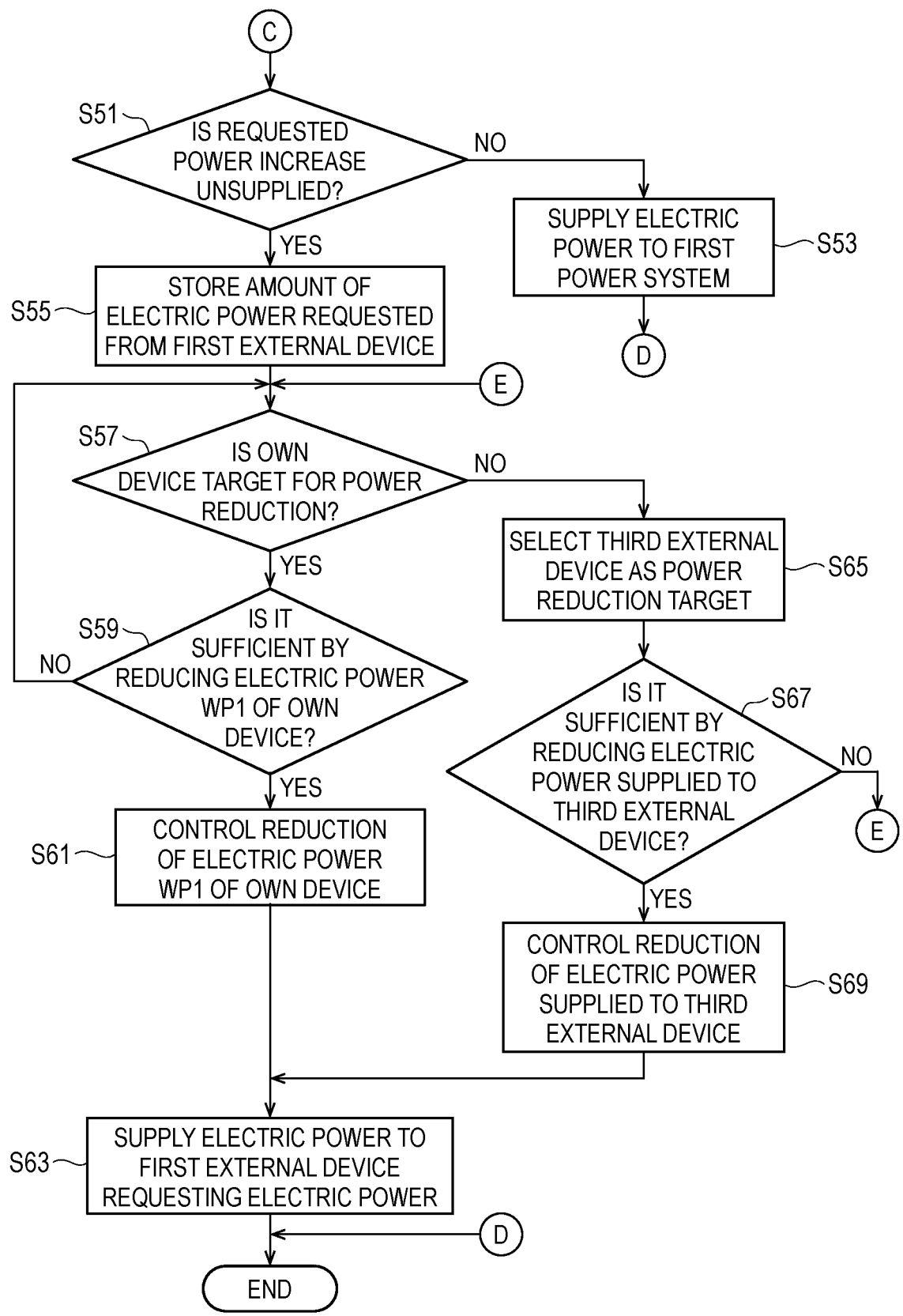
FIG. 6 illustrates a flowchart illustrating the content of the first power amount change control.

Next, the CPU 12 determines whether the increased electric power requested in S49 is to be supplied from the second external device 51 (S51 in FIG. 6). When it is determined that the increased of electric power requested in S49 is to be supplied from the second external device 51 (S51: NO), the CPU 12 supplies the electric power to the first external devices 41 to 43 that have requested to increase the electric power in S43 of FIG. 5 (S53). Thus, the CPU 12 supplies the increased electric power supplied from the second external device 51 to the first external devices 41 to 43 which is in another power system, thereby solving power shortage. The CPU 12 ends the first power amount change control illustrated in FIGS. 5 and 6.

On the other hand, when it is determined in S51 that the increased electric power requested in S49 is to be unsupplied from the second external device 51 (S51: YES), the CPU 12 stores the value of electric power amount requested from the first external devices 41 to 43 in S43. For example, the CPU 12 temporarily stores the value of requested electric power amount in the RAM 13 (S55).

Next, the CPU 12 executes processing to secure the electric power requested from the first external devices 41 to 43. In the present embodiment, only the second external device 51 is connected to the second power system 72. Furthermore, as described above, the second external device 51 cannot increase the supply power W2 to be supplied to the printer 1. In addition, since the first power system 71 is a power system that requests to increase electric power, it is difficult to secure electric power from the first external devices 41 to 43 of the first power system 71. Thus, the CPU 12 secures the electric power requested from the first external devices 41 to 43 by reducing at least one of electric power WP1 for operating the own device (the printer 1) and the supply power W3 (see FIG. 2) to be supplied to the third power system 73. The connection configuration and the number of external devices illustrated in FIG. 2 are merely examples. Accordingly, when there is a power system capable of reducing supply power in addition to the third power system 73, the CPU 12 may reduce the electric power to be supplied to the power systems or the external devices in the power systems.

After S55 is performed, the CPU 12 performs S57. In S57, the CPU 12 determines whether the own device is to be selected as a power reduction target. The CPU 12 determines whether the printer 1 which is the own device is set to be as a power reduction target based on a state of the own device (S57). For example, when the electric power WP1 necessary for operating the own device is small, the CPU 12 selects the own device as a power reduction target (S57: YES). For example, when the printer 1 is in a standby state in which printing is not performed, the CPU 12 selects the own device as a power reduction target. The CPU 12 may not determine whether the own device is set to be as a power reduction target based on the state of the own device. For example, the CPU 12 may set an initial value to prioritize a reduction in the electric power WP1 of the own device over a reduction in the supply power W3 of the third power system 73. In this case, the CPU 12 reduces the supply power W3 of the third power system 73 after trying to reduce the electric power WP1 of the own device.

When the own device is selected as a power reduction target (S57: YES), the CPU 12 determines whether the amount of electric power stored in S55, that is, the amount of electric power requested from the first external devices 41 to 43 can be supplemented by reducing the electric power WP1 of the own device (S59). For example, when the amount of the electric power stored in S55 is equal to or less than an amount to which the electric power WP1 can be reduced, the CPU 12 determines that the amount of requested electric power can be supplemented. When it is determined that the amount of electric power requested from the first external devices 41 to 43 can be supplemented by reducing the electric power WP1 of the own device (S59: YES), the CPU 12 performs control to reduce the electric power WP1 of the own device (S61). For example, the CPU 12 switches the printer 1 from the standby state in which printing is not performed to a power saving mode in which power consumption is minimized to reduce the electric power WP1. The CPU 12 stops charging of the battery 27, displaying on the display unit 20 B. and the like, and switches the printer 1 to the power saving mode. The CPU 12 supplies the electric power secured by the power reduction control in S61 to the first external devices 41 to 43 that have requested the electric power in S43 (S63). Accordingly, it is possible to solve the power shortage of the first power system 71. The CPU 12 ends the first power amount change control illustrated in FIGS. 5 and 6.

When it is determined in S59 that the amount of electric power requested from the first external devices 41 to 43 cannot be supplemented by reducing the electric power WP1 of the own device (S59: NO), the CPU 12 performs S57 again. In this case, the CPU 12 performs S57 and S59 until the state of the printer 1 is changed. For example, when the printer 1 is switched from the standby state to a printing state, the CPU 12 performs S65 without selecting the own device as a power reduction target (S57: NO).

In addition, in S57, when electric power is needed hereinafter, for example, such as a case when printing is being performed by the printer 1 or a case when a print job JOB is received, the CPU 12 does not select the own device as a power reduction target (S57: NO). When it is determined that the own device is not selected as a power reduction target (S57: NO), the CPU 12 selects the third external devices 61 and 62 as power reduction targets (S65). After S65 is performed, the CPU 12 performs S67.

In S67, the CPU 12 determines whether the amount of electric power requested from the first external devices 41 to 43 can be supplemented by reducing the electric power to be supplied to the third external devices 61 and 62. For example, the CPU 12 performs communications with the third external devices 61 and 62 and determines whether the supply power W3 to be supplied to the entire third power system 73 can be reduced. When the value of electric power amount stored in S55 is equal to or less than the amount to which the supply power W3 can be reduced, the CPU 12 determines that the amount of requested electric power can be supplemented (S67: YES). When it is determined the amount of requested electric power can be supplemented by reducing the supply power W3 (S67: YES), the CPU 12 performs control to reduce the supply power W3 (S69). The CPU 12 supplies the electric power secured by the reduction control in S69 to the first external devices 41 to 43 that have requested electric power in S43 (S63). Accordingly, it is possible to solve the power shortage of the first power system 71. The CPU 12 may execute a process of reducing electric power to be supplied to each of the third external devices 61 and 62 without reducing the supply power W3 to be supplied to the entire third power system 73. Specifically, the CPU 12 may perform the reduction control by determining whether the amount of requested electric power can be supplemented by reducing the electric power to be supplied to each of the third external devices 61 and 62.

On the other hand, when it is determined in S67 that the electric power requested from the first external devices 41 to 43 cannot be supplemented by reducing the supply power W3 (S67: NO), the CPU 12 performs S57 again. In this case, the CPU 12 repeatedly performs S57, S65, and S67 until the states of the printer 1, the third external devices 61 and 62, and the like are changed. For example, when the printer 1 is switched from the printing state to the standby state, the CPU 12 changes the power reduction target from the third external devices 61 and 62 to the own device (S57: YES). In this manner, the CPU 12 according to the present embodiment performs a process in response to a request to increase supply power.

4. Second Power Amount Change Control

In the first power amount change control, the control performed when a power amount change request is received from an external device of a power sink has been described above. Next, second power amount change control, which is a control performed when a power amount change request is received from an external device of a power source will be described with reference to FIGS. 7 and 8. As an example, when electric power is supplied to the first power system 71, a case in which a request to change the supply power W2 is received from the second external device 51 of the second power system 72 will be described below.

Figure 7:
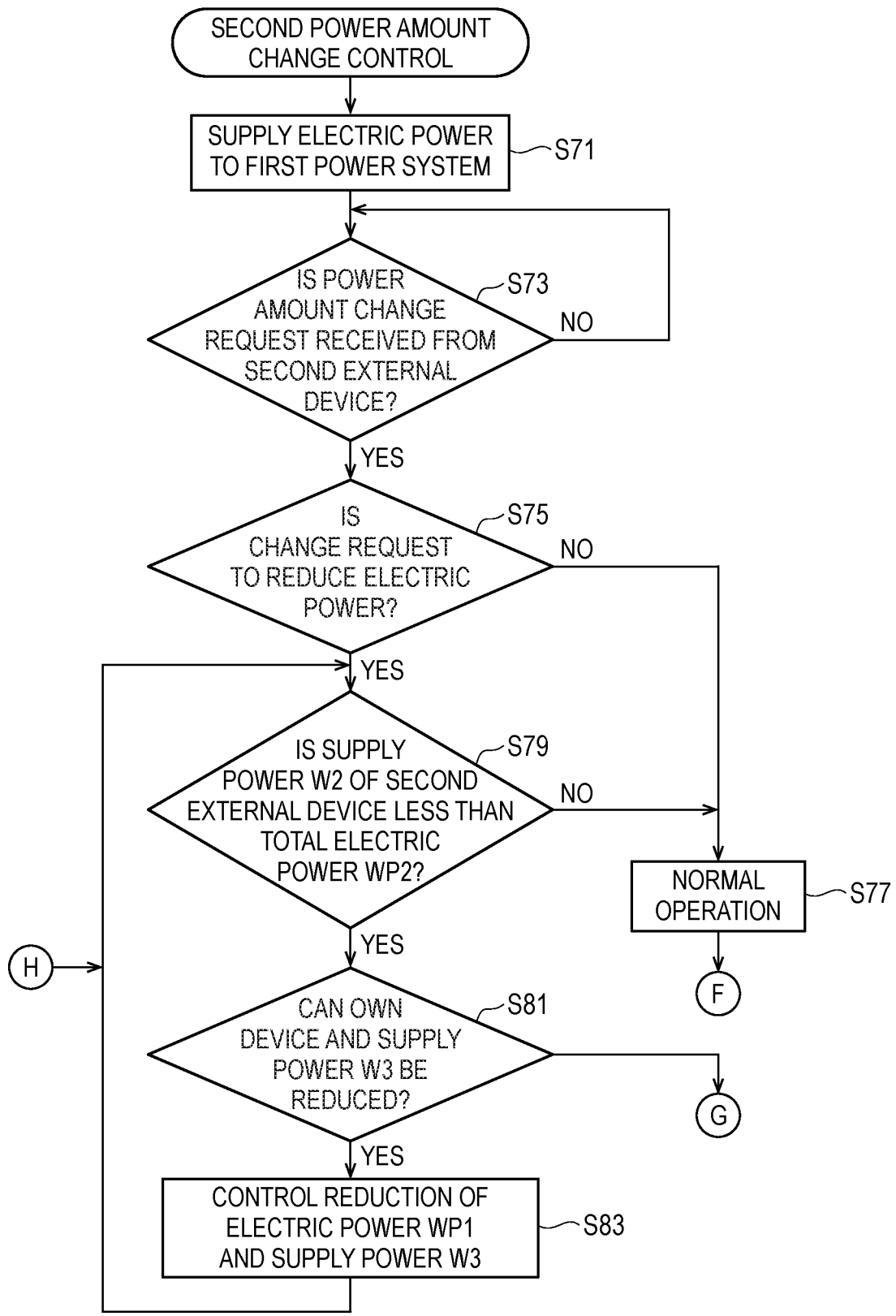
FIG. 7 illustrates a flowchart illustrating the content of second power amount change control.

First, in S71 of FIG. 7, the CPU 12 supplies electric power to the first external devices 41 to 43 of the first power system 71. For example, when S29 of FIG. 3 described above is performed, the CPU 12 can supply the supply power W1 (see FIG. 2) to the first external devices 41 to 43. Next, while the supply power W1 is supplied to the first power system 71, the CPU 12 determines whether a request to change the amount of the supply power W2 is received from the second external device 51 which is a power source of the second power system 72 (S73). When the request to change the amount of the supply power W2 is not received from the second external device 51 (S73: NO), the CPU 12 repeatedly performs the determination process of S73.

In addition, when the request to change the amount of the supply power W2 is received from the second external device 51 (S73: YES), the CPU 12 determines whether the received change request is a request to reduce the supply power W2 (S75). When it is determined that the change request received in S73 is a request not to reduce the supply power W2, that is, a request to increase the amount of the supply power W2 (S75: NO), the CPU 12 performs a normal operation (S77). In this case, since the amount of electric power supplied from the power source is increased, there is no need to newly secure electric power and thus the CPU 12 does not perform control to secure electric power and thus is operated normally. The CPU 12 ends the second power amount change control illustrated in FIGS. 7 and 8.

In the present embodiment, the change request from an external device as a power source includes "the request to increase the electric power" and "the request to reduce the electric power." The external device as a power source indicates for example the second external device 51.

"the request to reduce the electric power from an external device as a power source" means for example "a notification of a power amount that the external device as a power source can supply, the notification of a power amount smaller than a power amount that the own device is supplied from the external device as a power source."

"the request to increase the electric power from an external device as a power source" means for example "a notification of a power amount that the external device as a power source can supply, the notification of a power amount larger than a power amount that the own device is supplied from the external device as a power source."

In a case where the own device is a power source, as is the above case, the CPU 12 sends the change request to each external device through each USB connecting unit.

On the other hand, when it is determined that the change request is a request to reduce the supply power W2 (S75: YES), the CPU 12 determines whether the amount of the supply power W2 supplied from the second external device 51 after reducing the supply power W2 is less than the amount of total electric power WP2 (S79). Here, the total electric power WP2 is, for example, the sum of the supply power W1 supplied to the first power system 71, the supply power W3 supplied to the third power system 73, and the electric power WP1 consumed by the printer 1 as illustrated in FIG. 2. That is, the total electric power WP2 refers to total electric power including electric power consumed by the printer 1 and electric power supplied from the printer 1. In S79, the CPU 12 compares the reduced supply power W2 with the total electric power WP2 (=W1+W3+WP1). As a result, the CPU 12 can determine whether it is necessary to newly secure electric power.

When the reduced supply power W2 is not less than the total electric power WP2 (S79: NO), the CPU 12 performs a normal operation (S77). In this case, since it is unnecessary to newly secure electric power, the CPU 12 does not perform control to secure electric power and thus is operated normally.

When the reduced supply power W2 is less than the total electric power WP2, that is, when the supply power W2 is insufficient, compared to the total electric power WP2 (S79: YES), the CPU 12 performs control to supplement insufficient electric power. First, the CPU 12 determines whether at least one of the electric power WP1 for operating the own device (the printer 1) and the supply power W3 of the third power system 73 can be reduced (S81). For example, the CPU 12 determines whether the electric power WP1 can be reduced by stopping a function of the own device, such as by switching the own device to the power saving mode. Furthermore, the CPU 12 can determine whether the supply power W3 can be reduced by determining whether the amount of electric power supplied to each of the third external devices 61 and 62 can be reduced through communications with the third external devices 61 and 62.

When it is determined that at least one of the electric power WP1 of the own device and the supply power W3 can be reduced (S81: YES), the CPU 12 performs control to reduce the electric power WP1 or the like (S83). The CPU 12 can reduce the total electric power WP2 by reducing the electric power WP1. The CPU 12 can reduce the total electric power WP2 by reducing the supply power W3 by reducing the amount of electric power supplied to each of the third external devices 61 and 62. After S83 is performed, the CPU 12 performs S79 again. For example, the CPU 12 reduces the electric power WP1 when S83 is performed initially. The CPU 12 compares the supply power W2 with the total electric power WP2 after reducing the electric power WP1 (S79). When the supply power W2 is less than the electric power WP1 (S79: YES), the CPU 12 reduces the supply power W3 when S83 is performed secondly. The CPU 12 compares the supply power W2 with the total electric power WP2 after reducing of the electric power WP1 and the supply power W3 (S79). When the supply power W2 becomes equal to or greater than the total electric power WP2 (S79: NO), the CPU 12 performs a normal operation (S77). The CPU 12 may collectively reduce both the electric power WP1 and the supply power W3. Alternatively, the CPU 12 may reduce the electric power WP1 after reducing the supply power W3.

For example, the CPU 12 performs S83 to reduce the electric power WP1 of the own device as much as possible. Furthermore, when S83 is performed, for example, the CPU 12 supplies the supply power W3 having a lowest voltage (for example, 5 V) that can be supplied according to the USB PD standard to the third external devices 61 and 62. As a result, when it is determined in S81 that the electric power WP1 and the supply power W3 cannot be reduced (S81: NO), the CPU 12 determines whether the supply power W1 of the first power system 71 can be reduced (S85 in FIG. 8). Thus, the CPU 12 of the present embodiment prioritizes reduction of electric power of a device controlled as a USB host over reduction of electric power of a device not controlled as a USB host, by a power source requesting power amount reduction. Specifically, before reducing the supply power W1 of the first power system 71, the CPU 12 prioritizes the reduction of the electric power WP1 of the printer 1 controlled by the second external device 51 as a USB host. Furthermore, before reducing the supply power W1 of the first power system 71, the CPU 12 prioritizes the reduction of the supply power W3 of the third external devices 61 and 62 controlled by the printer 1 as a USB host, that is, the third external devices 61 and 62 controlled by the second external device 51 via the printer 1. As a result, it is possible to preferentially reduce electric power of a device connected to the same USB connection system as a power source requesting power amount reduction. The order of reducing electric power in the second power amount change control illustrated in FIGS. 7 and 8 is an example, and the supply power W1 may be reduced before the reduction of the electric power WP1 and the supply power W2.

Figure 8:
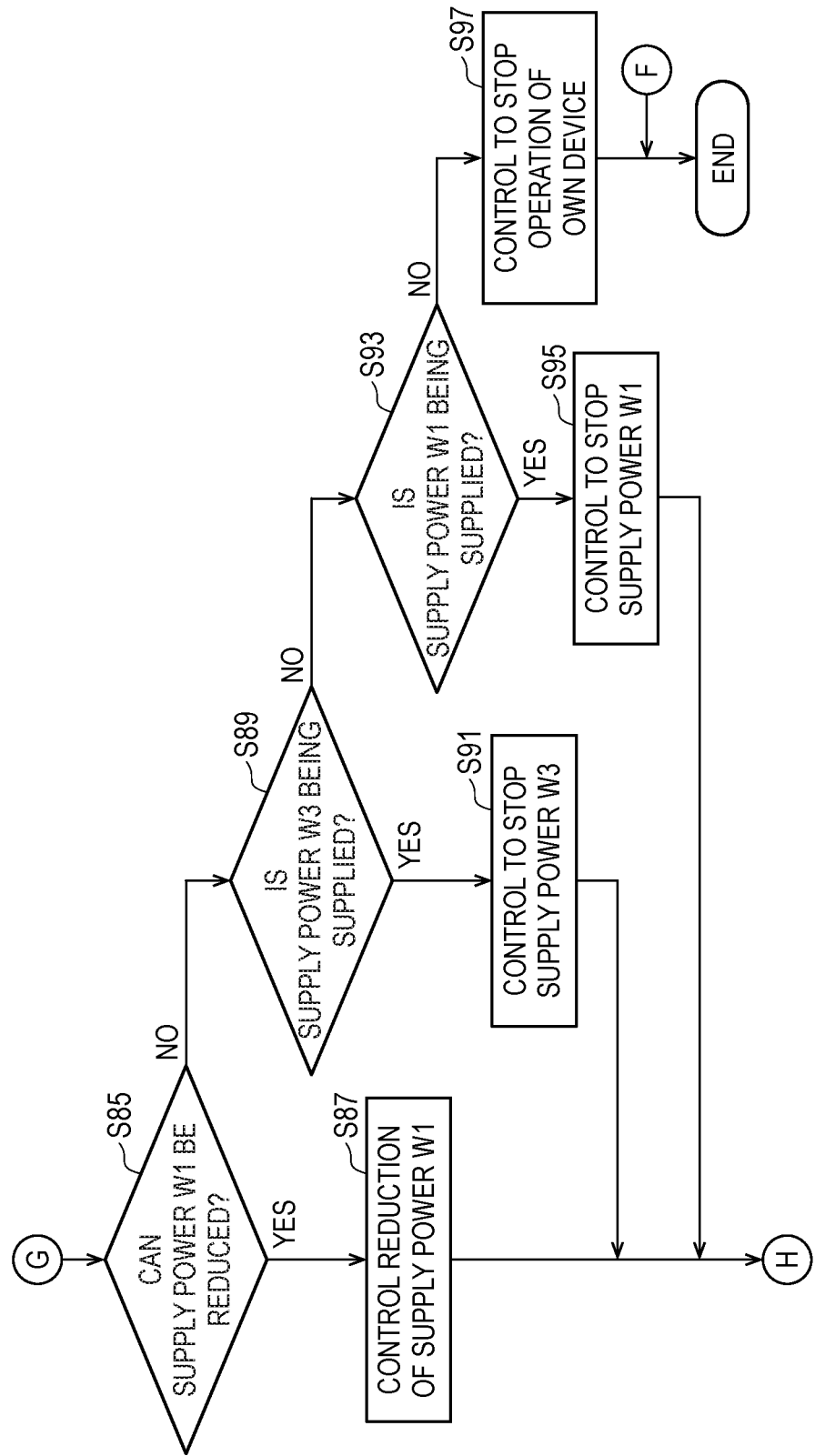
FIG. 8 illustrates a flowchart illustrating the content of the second power amount change control.

In FIG. 8, when it is determined that the supply power W1 can be reduced (S85: YES), the CPU 12 performs control to reduce the supply power W1 (S87). For example, the CPU 12 can determine whether the supply power W1 can be reduced by determining whether the amount of electric power to be supplied to each of the first external devices 41 to 43 can be reduced through communications with the first external devices 41 to 43. After S87 is performed, the CPU 12 performs S79 of FIG. 7 again. In this case, the CPU 12 compares the supply power W2 reduced in response to the request from the second external device 51 with the total electric power WP2 after reducing the supply power W1 in S87.

When it is determined in S85 that the supply power W1 cannot be reduced (S85: NO), the CPU 12 performs control to stop the supply of the supply power W1 and W3 to the third external devices 61 and 62 and the first external devices 41 to 43. Accordingly, the insufficient power is secured by completely eliminating the supply powers W1 and W3.

In addition, for example, by performing S87, the CPU 12 supplies the supply power W1 having a lowest voltage (for example, 5 V) that can be supplied according to the USB PD standard to the first external devices 41 to 43. As a result, the CPU 12 determines in S85 performed again that the supply power W1 cannot be reduced (S85: NO), and determines whether the supply power W3 is supplied to the third external devices 61 and 62 (S89). When it is determined that the supply power W3 is supplied to the third external devices 61 and 62 (89: YES), the CPU 12 performs control to stop the supply of the supply power W3 (S91). After S91 is performed, the CPU 12 performs S79 of FIG. 7 again. In this case, the CPU 12 compares the supply power W2 reduced in response to the request from the second external device 51 with the total electric power WP2 after stopping the supply of the supply power W3 in S91.

Similarly, when it is determined in S89 that the supply power W3 is not supplied to the third external devices 61 and 62 (S89: NO), the CPU 12 determines whether the supply power W1 is supplied to the first external devices 41 to 43 (S93). When it is determined that the supply power W1 is supplied to the first external devices 41 to 43 (S93: YES), the CPU 12 performs control to stop the supply of the supply power W1 (S95). After S95 is performed, the CPU 12 performs S79 of FIG. 7 again.

When it is determined in S93 that the supply power W1 is not supplied to the first external devices 41 to 43 (S93: NO), the CPU 12 performs control to stop the operation of the own device (S97). In this case, there is a possibility that the printer 1 cannot be operated normally due to power shortage. Accordingly, in S97, the CPU 12 performs a process of stopping the operation of the printer 1, a process of notifying an alarm, or the like. When S97 is performed, the CPU 12 ends the second power amount change control illustrated in FIGS. 7 and 8. In this way, the CPU 12 of the present embodiment performs processing in response to a request to reduce supply power.

In addition, the printer 1 is an example of an information processing apparatus. The CPU 12 is an example of a controller. S11 is an example of the first request process. S13 is an example of the first determination process. S17 is an example of the second request process. The print job JOB is an example of a job.

5. Effect

As described above, according to the above-described first embodiment, the following effects are obtained.

(1) The printer 1 according to the present embodiment includes the first USB connecting unit 31 for transmitting electric power to or receiving electric power from the first external devices 41 to 43 through a connection according to the USB PD standard, the second USB connecting unit 32 for transmitting electric power to or receiving electric power from the external device 51 through a connection according to the USB PD standard, and the CPU 12. The CPU 12 performs the first request process (S11) of requesting the first external device 41 to supply electric power via the first USB connecting unit 31 through communications according to the USB PD standard, the first determination process (S13) of determining whether the requested electric power is to be supplied from the first external device 41 as a result of the first request process, and the second request process (S17) of requesting the second external device 51 to supply electric power via the second USB connecting unit 32 through communications according to the USB PD standard, when it is determined in the first determination process that the requested electric power is to be unsupplied from the first external device (S13: YES).

Accordingly, even though electric power is to be unsupplied when the first external device 41 is requested to supply electric power via the first USB connecting unit 31, the second external device 51 is requested to supply electric power via the second USB connecting unit 32, thereby increasing a possibility that the printer 1 will receive electric power from the outside. For example, when the electric power for driving the first external devices 42 and 43 is insufficient, the electric power supplied from the second external device 51 is supplied to the first external devices 42 and 43 via the printer 1, thereby driving the first external devices 42 and 43. Accordingly, when a plurality of external devices are connected, the electric power supplied from the external devices and the electric power to be supplied to the external devices can be adjusted.

(2) In addition, the CPU 12 performs a second determination process (S19) of determining whether the requested electric power is to be supplied from the second external device 51 as a result of the second request process, and a first notification process (S23) of notifying the first external device 41 of a request to change a power supply direction via the first USB connecting unit 31 when it is determined in the second determination process that the requested electric power is to be supplied from the second external device 51 (S19: YES).

Accordingly, when the requested electric power is to be supplied from the second external device 51, the CPU 12 notifies the first external device 41 of the request to change the power supply direction (a request to set a power source or the like). As a result, the CPU 12 can become a power source for the first power system 71 of the first USB connecting unit 31, and can supply electric power to the first external devices 41 to 43 connected to the first USB connecting unit 31.

(3) Furthermore, the CPU 12 performs a third determination process (S25) of determining whether a request to supply electric power is received from the first external devices 41 to 43 after the power supply direction is changed in response to the first notification process; and a power supply process (S29) of supplying electric power to the first external devices 41 to 43 when it is determined in the third determination process that the request to supply electric power is received from the first external devices 41 to 43 (S25: YES).

Accordingly, the CPU 12 becomes a power source for the first power system 71 of the first USB connecting unit 31 by the change of the power supply direction and then can supply electric power supplied from the second external device 51 to the first external devices 41 to 43 when a request to supply electric power is received from the first external devices 41 to 43 connected to the first USB connecting unit 31.

(4) Each of the first external devices 41 to 43 includes a device for requesting the printer 1 to execute a print job JOB related to image processing.

As a result, each of the first external devices 41 to 43 includes a device (for example, a PC) for requesting the printer 1 to execute the print job JOB. In this configuration, even when electric power is not supplied from the first external devices 41 to 43 that request the execution of the print job JOB, the print job JOB received from the first external devices 41 to 43 can be executed by the electric power supplied from the second external device 51.

(5) In addition, the CPU 12 performs the second determination process (S19) of determining whether the requested electric power is to be supplied from the second external device 51 as a result of the second request process, and a second notification process (S33) of notifying the first external devices 41 to 43 that the print job JOB is receivable, when it is determined in the second determination process that the requested electric power is to be supplied from the second external device 51 (S19: YES).

As a result, when it is confirmed that electric power is to be supplied from the second external device 51, the CPU 12 can notify the first external devices 41 to 43 of this fact and can stand by in a state capable of receiving the print job JOB.

(6) Furthermore, in a state in which the electric power is supplied to the first external devices 41 to 43, the CPU 12 performs a first power increase request process (S49) of requesting the second external device 51 to increase the electric power supplied from the second external device 51 when a request to increase electric power supplied to the first external devices 41 to 43 is received from the first external devices 41 to 43.

As a result, when the electric power is supplied to the first external devices 41 to 43, and the request to increase electric power is received from the first external devices 41 to 43, the CPU 12 requests the second external device 51 which is a power source to increase the electric power. Accordingly, the increased electric power supplied from the second external device 51 can be supplied to the first external devices 41 to 43.

(7) The printer 1 includes the third USB connecting unit 33 for transmitting electric power to and receiving electric power from the third external devices 61 and 62 through a connection according to the USB standard. The CPU 12 performs a fourth determination process (S51) of determining whether the increased electric power requested is to be supplied from the second external device 51 as a result of the first power increase request process; and a first power reduction process (S61 or S69) of reducing at least one of the electric power WP1 of the own device (the printer 1) and the electric power to be supplied to the third external devices 61 and 62 based on the state of the own device, when it is determined in the fourth determination process that the increased electric power requested is to be unsupplied from the second external device 51 (S51: YES).

As a result, the CPU 12 can preferentially reduce the electric power WP1 of the own device when the own device is, for example, in the power saving mode in which the operation is temporarily stopped. When, for example, printing is being performed, the CPU 12 can preferentially reduce the electric power supplied to the third external devices 61 and 62. Accordingly, a power reduction target can be appropriately selected to secure the requested electric power according to whether electric power is necessary for the own device.

(8) In addition, in a state in which electric power is supplied from the second external device 51, when a power reduction request to reduce the supply power W2 supplied from the second external device 51 is received from the second external device 51, the CPU 12 performs a first power reduction request to request the first external devices 41 to 43 to reduce electric power to be supplied to the first external devices 41 to 43 via the first USB connecting unit 31 (S87).

Thus, when the electric power is supplied from the second external device 51 and the supply power W2 is requested to be reduced from the second external device 51, the CPU 12 requests to reduce the electric power supplied to the first external device 41 to 43 which are power supply destinations. Thus, it is possible to reduce the electric power as requested from the second external device 51 by reducing the power of the first external devices 41 to 43.

(9) The printer 1 further includes the third USB connecting unit 33 for transmitting electric power to and receiving electric power from the third external devices 61 and 62 through a connection according to the USB PD standard. The CPU 12 performs a fifth determination process (S79) of determining whether the supply power W2 supplied from the second external device 51 after reducing the electric power in response to the power reduction request received from the second external device 51 is equal to or greater than the total electric power WP2 which is the sum of electric power necessary for the own device (the printer 1), electric power necessary for the first external devices 41 to 43, and electric power necessary for the third external devices 61 and 62. The CPU 12 does not perform a first power reduction request process (S87), when it is determined as a result of the fifth determination process that the power supply W2 supplied from the second external device 51 after reducing the electric power is equal to or greater than the total electric power WP2 (S79: No).

As a result, prior to performing the first power reduction request process, the CPU 12 determines whether the supply power W2 of the second external device 51 after reducing the electric power is equal to or greater than the necessary total electric power WP2, and does not perform the first power reduction request process when the reduced electric power supply W2 is equal to or greater than the total electric power WP2. As a result, when the total electric power WP2 can be secured even after reducing the electric power supplied from the second external device 51, unnecessary electric power reduction is not requested to the first external devices 41 to 43.

(10) When it is determined as the result of the fifth determination process that the supply power W2 supplied from the second external device 51 after reducing the electric power is less than the total electric power WP2 (S79: YES), the CPU12 performs a second power reduction process (S83) of reducing the electric power to be supplied to the third external devices 61 and 62, prior to performing the first power reduction request process (S87).

As a result, when the supply power W2 of the second external device 51 after reducing the electric power is less than the total electric power WP2, the electric power to be supplied to the third external devices 61 and 62 is reduced before reducing the electric power to be supplied to the first external devices 41 to 43. Accordingly, it is possible to prevent a reduction in the electric power to be supplied to the first external devices 41 to 43.

Second Embodiment

Next, a second embodiment which embodies an information processing apparatus of the present disclosure will be described. In the power supply control according to the previous embodiment illustrated in FIGS. 3 and 4, when the requested electric power is to be supplied from the second external device 51 of the second power system 72 (S19: Yes), the CPU 12 supplies the electric power to the first external devices 41 to 43 of the first power system 71 (S29). On the other hand, in the second embodiment, the CPU 12 notifies the first external devices 41 to 43 that the suppliable electric power has increased, instead of supplying the electric power to the first external devices 41 to 43.

Figure 9:
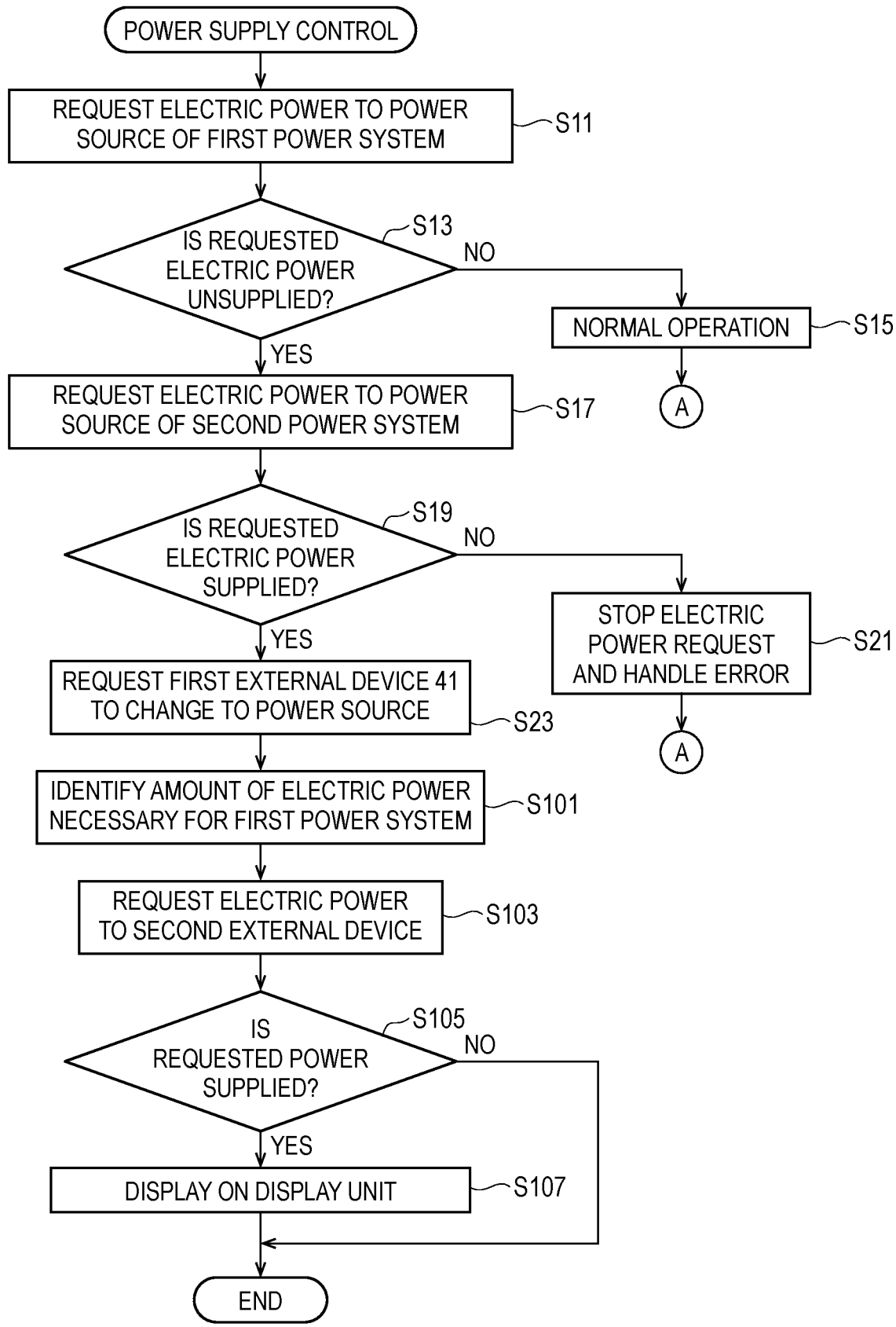
FIG. 9 is a flowchart illustrating the content of power supply control according to a second embodiment.

FIG. 9 illustrates the details of power supply control according to the second embodiment. In the following description, processes which are the same as those of FIGS. 3 and 4 will be denoted by the same reference numerals and the description thereof will be appropriately omitted. First, in S23 of FIG. 9, as in S23 of FIG. 3, the CPU 12 notifies the first external device 41 of a request to set the own device (the printer 1) as a power source for the first power system 71 (S23). The printer 1 is set as the power source for the first power system 71 (S23).

After the printer 1 is set as the power source in S23, the CPU 12 identifies the amounts of electric power necessary for the first external devices 41 to 43 of the first power system 71 (S101). The CPU 12 identifies the amount of power necessary for each of the first external devices 41 to 43 by performing communications via the first USB connecting unit 31 according to the USB PD standard. When the electric power requested from the first external device 41 is to be unsupplied in S13 (S13: YES), there is a high possibility that the other first external devices 42 and 43 are not supplied with sufficient electric power from the first external device 41 which is a power source, thereby having power shortage. Accordingly, the CPU 12 identifies the amount of electric power necessary for each device in the first power system 71.

After S101 is performed, the CPU 12 performs S103. The CPU 12 requests the second external device 51 which is a power source to supply the amount of electric power necessary for each of the first external devices 41 to 43, which has been identified in S101 (S103). The CPU 12 has been supplied with the supply power W2 from the second external device 51 by performing S17 and thus requests the second external device 51 to increase the supply power W2 (S103). When the supply of electric power is not requested from the first external devices 41 to 43 in S101 the CPU 12 may end the process illustrated in FIG. 9.

Next, in S105, the CPU 12 determines whether the electric power requested in S103 is to be supplied from the second external device 51. When it is determined that the requested electric power is to be unsupplied from the second external device 51 (S105: NO), the CPU 12 ends the power supply control illustrated in FIG. 9.

On the other hand, when it is determined that the requested electric power is to be supplied from the second external device 51 (S105: YES), the CPU 12 does not supply the electric power to the first external devices 41 to 43 that require the electric power, and performs the display process on the display unit 20B (S107). For example, the CPU 12 displays on the display unit 20B that the amount of electric power that can be supplied by the printer 1, which is the own device, has increased. Thus, a user can notice that the printer 1 has suppliable surplus electric power by viewing the display on the display unit 20B. Thus, when electric power is not supplied from the first power system 71, but is supplied from the second power system 72, the CPU 12 of the second embodiment does not supply the electric power to the power system 71 and displays the increase in the amount of suppliable electric power of the printer 1. A method of informing a user of the increase in the amount of suppliable electric power is not limited to a method of displaying this fact on the display unit 20B, and, for example, a method of turning on a lamp provided on the printer 1 may be used.

In addition, in S107, the CPU 12 may display, for example, an indication to prompt connection to a specific connecting unit. For example, the CPU 12 may display an indication to prompt an external device requiring power to connect to the third USB connecting unit 33, since the amount of power to be supplied via the third USB connecting unit 33 is increased. Thus, a user can identify where to connect the external device having power shortage by viewing the indication displayed on the display unit 20B. After S107 is performed, the CPU 12 ends the power supply control illustrated in FIG. 9.

6. Effect

According to the above-described second embodiment, the following effects are obtained.

When it is determined in the second determination process that the requested electric power is to be supplied from the second external device (S19 of FIG. 9: YES), the CPU 12 performs a second power increase request process (S103) of requesting the second external device 51 to increase the electric power supplied from the second external device 51, a sixth determination process (S105) of determining whether the increased electric power requested in S103 is to be supplied from the second external device 51 as a result of the second power increase request process, and a notification process (S107) of notifying that the amount of electric power to be supplied from the own device is increased when it is determined in the sixth determination process that the increased electric power requested in S103 is to be supplied from the second external device 51 (S105: YES).

Accordingly, a user can identify that there is usable surplus power that is supplied from the printer 1.

7. Modified Example

The present disclosure is not limited to the above-described embodiments and various improvements and modifications can be made without departing from the spirit of the present disclosure.

For example, in each of the above-described embodiments, although a plurality of first external devices 41 to 43 are provided, only one external device (for example, the first external device 41) may be provided. Furthermore, although one second external device 51 is provided, a plurality of second external devices may be provided. In addition, although a plurality of third external devices 61 and 62 are provided, only one third external device may be provided.

In the present disclosure, the USB standard is not limited to the USB PD standard, and other standards capable of changing the supply power W1 to the supply power W3 through negotiation may be used.

Each of the first external devices 41 to 43 may not include a device that requests the printer 1 to execute a job related to image processing (such as the print job JOB).

In addition, when it is determined in S19 that the requested electric power is to be supplied from the second external device 51 (S19: YES), the CPU 12 may not notify the first external devices 41 to 43 that it is possible to receive the print job JOB.

When it is determined in S51 of the first power amount change control illustrated in FIG. 6 that the requested electric power is to be unsupplied from the second external device 51 (S51: YES), the CPU 12 may reduce at least one of the electric power WP1 for operating the own device and the supply power W3 to be supplied to the third external devices 61 and 62.

In the second power amount change control illustrated in FIGS. 7 and 8, the CPU 12 may perform the process of reducing the supply power W1 of the first power system 71 (S85 and S87), prior to the process of reducing the electric power of the own device and the power of the third external devices 61 and 62 (S81 and S83).

The CPU 12 may not execute at least one of the first power amount change control illustrated in FIGS. 5 and 6, and the second power amount change control illustrated in FIGS. 7 and 8.

The destination in which the control program 151 is stored is not limited to the ROM 14, and may include other computer-readable recording media, such as a RAM, a hard disk, a CD-ROM, a DVD-ROM, etc.

In each of the above-described embodiments, the CPU 12 is employed as a controller of the present disclosure, but the present disclosure is not limited thereto. For example, the controller may be configured with dedicated hardware such as an application specific integrated circuit (ASIC). Furthermore, the controller may be configured to be operated, for example, using both software processing and hardware processing.

In the above-described embodiments, the portable printer 1 is employed as an information processing apparatus of the present disclosure, but the present disclosure is not limited thereto. For example, the information processing apparatus of the present disclosure may be a label printer, a copying apparatus, a facsimile apparatus, or a scanner apparatus. Furthermore, the information processing apparatus of the present disclosure is not limited to a portable information processing apparatus, and may be a non-portable information processing apparatus. The information processing apparatus may be a multifunction peripheral having a printing function, a copying function, a scanner function, and a FAX function.

What is claimed is:

1. An information processing apparatus comprising:
a first USB (Universal Serial Bus) interface;
a second USB (Universal Serial Bus) interface; and
a controller configured to:
request, via the first USB interface, a first external device to supply electric power to the information processing apparatus;
receive a response message to the request via the first USB interface from the first external device;
determine, based on the response message, whether the first external device accepts or rejects the request to supply electric power while the first external device is connected to the first USB interface;
request, via the second USB interface, a second external device to supply electric power to the information processing apparatus when the controller determines that the first external device which is connected to the information processing apparatus via the first USB interface, rejects the request to supply the electric power to the information processing apparatus;
request the second external device to supply electric power via the second USB interface when the controller receives a job related to image processing from the first external device; and
supply a part of the electric power supplied from the second external device to the first external device.

2. The information processing apparatus according to claim 1,
wherein the controller is configured to:
determine whether the second external device accepts the request to supply the electric power while the second external device is connected to the second interface; and request the first external device to swap a power role via the first USB interface when the controller determines that the second external device accepts the request to supply the electric power.

3. The information processing apparatus according to claim 2,
wherein the controller is configured to:
determine whether the first external device accepts the request to swap the power role;
change the power role of the first USB interface when the controller determines that the first external device accepts the request to swap the power role;
determine whether the controller receives a request to supply electric power from the first external device via the first USB interface after the power role of the first USB interface is changed; and
supply electric power to the first external device when the controller determines that the controller receives the request to supply the electric power from the first external device via the first USB interface.

4. The information processing apparatus according to claim 3, wherein the information processing apparatus supplies electric power to the first external device while or after receiving electric power from the second external device.

5. The information processing apparatus according to claim 1
wherein the controller is configured to:
send the first external device a message indicating that the job is receivable when the controller determines that the second external device accepts the request to supply the electric power.

6. The information processing apparatus according to claim 1,
wherein the controller is configured to:
request the second external device to increase the electric power to be supplied from the second external device, when the controller receives a request to increase electric power from the first external device via the first USB interface in a state where the electric power is supplied to the first external device via the first USB interface.

7. The information processing apparatus according to claim 1,
wherein the controller is configured to:
request the first external device to reduce the electric power to be supplied to the first external device via the first USB interface when the controller receives a request, from the second external device, to reduce the electric power to be supplied from the second external device in a state where the electric power is supplied from the second external device via the second USB interface.

8. The information processing apparatus according to claim 1, further comprising:
a print engine to print an image on a sheet,
wherein the controller is configured to request the second external device to supply electric power via the second USB interface when the controller receives a print job from the first external device.

9. The information processing apparatus according to claim 1, wherein the controller is further configured to send a message for changing a power role of the information processing apparatus to the first external device, after the controller determines that the first external device rejects the request to supply the electric power.

10. An information processing apparatus comprising:
a first USB (Universal Serial Bus) interface;
a second USB (Universal Serial Bus) interface;
a print engine to print an image on a sheet, and
a controller configured to:
request, via the first USB interface, a first external device to supply electric power to the information processing apparatus, the request including an amount of requested electric power;
request, via the second USB interface, a second external device to supply electric power to the information processing apparatus when the controller determines that the requested electric power is to be unsupplied from the first external device while the first external device is connected to the first USB interface, the determination based on at least one of (a) receiving a response message to the request indicating a rejection of supplying electric power from the first external device to the information processing apparatus, (b) not receiving a response message to the request indicating acceptance of supplying electric power from the first external device to the information processing apparatus, or (c) receiving a supply of electric power lower than the amount of requested electric power;
request the second external device to supply electric power via the second USB interface when the controller receives a print job, to be printed by the print engine, from the first external device; and
supply a part of the electric power supplied from the second external device to the first external device.

11. A method of controlling an information processing apparatus including a USB (Universal Serial Bus) interface, a second USB (Universal Serial Bus) interface, and a controller,
the method, executed by the controller, comprising the steps of:
requesting, via the first USB interface, a first external device to supply electric power to the information processing apparatus;
receiving a response message to the request via the first USB interface from the first external device;
determining, based on the response message, whether the first external device accepts or rejects the request to supply electric power while the first external device is connected to the first USB interface;
requesting, via the second USB interface, a second external device to supply electric power to the information processing apparatus when the controller determines that the first external device which is connected to the first USB interface rejects the request to supply the electric power to the information processing apparatus;
requesting the second external device to supply electric power via the second USB interface when the controller receives a job related to image processing from the first external device; and
supplying a part of the electric power supplied from the second external device to the first external device.

12. A non-transitory computer-readable recording medium storing computer-readable instructions for an information processing apparatus comprising a first USB (Universal Serial Bus) interface, a second USB (Universal Serial Bus) interface, and a controller,
the computer-readable instructions, when executed by the controller, causing the information processing apparatus to perform:
requesting, via the first USB interface, a first external device to supply electric power to the information processing apparatus;

receiving a response message to the request via the first USB interface from the first external device;

determining, based on the response message, whether the first external device accepts or rejects the request to supply electric power while the first external device is connected to the first USB interface;

requesting, via the second USB interface, a second external device to supply electric power to the information processing apparatus when the controller determines that the first external device which is connected to the first USB interface rejects the request to supply the electric power to the information processing apparatus; and requesting the second external device to supply electric power via the second USB interface when the controller receives a job related to image processing from the first external device; and supplying a part of the electric power supplied from the second external device to the first external device.

* * * * *

UNITED STATES PATENT AND TRADEMARK OFFICE
CERTIFICATE OF CORRECTION

PATENT NO. : 11,223,734 B2  
APPLICATION NO. : 16/261664  
DATED : January 11, 2022  
INVENTOR(S) : Katsunori Sakai et al.

It is certified that error appears in the above-identified patent and that said Letters Patent is hereby corrected as shown below:

In the Claims

Column 24, Claim 11, Line 31 should read:  
apparatus including a first USB (Universal Serial Bus) interface, Column 25, Claim 12, Line 13:  
The word "and" should be deleted Signed and Sealed this  
Twenty-seventh Day of June, 2023

Katherine Kelly Vidal  
*Director of the United States Patent and Trademark Office*